July 28, 1942.  R. L. BROWN  2,290,939
CLIP
Filed Nov. 18, 1940
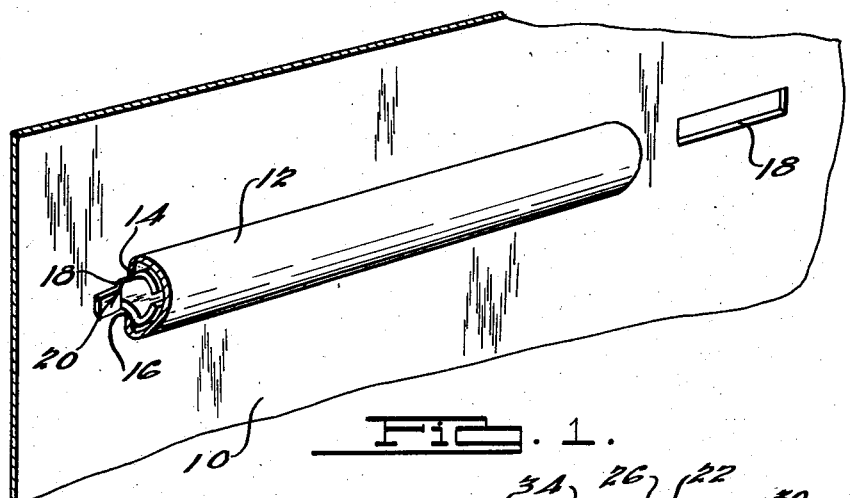
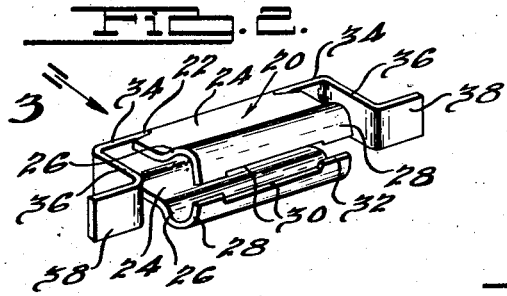
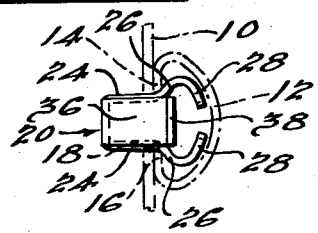
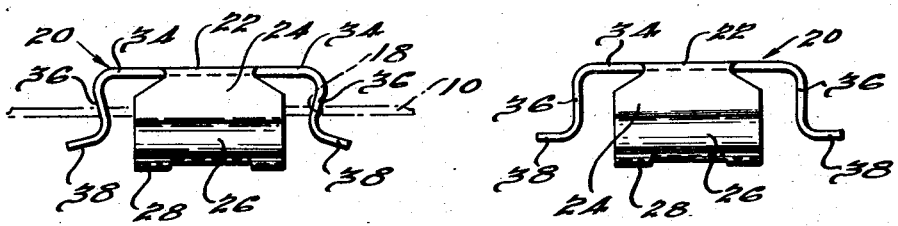
INVENTOR
Robert L. Brown.
BY
Harness, Dickey & Pierce
ATTORNEYS.

Patented July 28, 1942

2,290,939

UNITED STATES PATENT OFFICE 2,290,939

CLIP

Robert L. Brown, Detroit, Mich., assignor to William R. Wiley, Detroit, Mich.

Application November 18, 1940, Serial No. 366,024

7 Claims. (Cl. 189—88)

The present invention relates to improved attaching clips for attaching sheet metal moldings, or the like, to a sheet metal panel, such as the type used in automobiles.

One of the primary objects of the present invention is to provide an improved attaching clip of the type mentioned, which may be applied quickly and effectively to accurately fix a channel-shaped molding, or the like, to a sheet metal backing member.

Another object of the present invention is to provide an improved attaching clip of the type mentioned which lends itself to economic mass production and which is relatively inexpensive to manufacture.

Another object of the present invention is to provide an improved attaching clip of the type mentioned, which may be applied through generally rectangular apertures formed in a panel and in which the resilient anchoring means for anchoring the clip to the panel and for anchoring the clip to the molding exert forces, respectively, which are generally normal to each other.

Other objects of the invention will become apparent from the following specification, the drawing relating thereto, and from the claims hereinafter set forth.

In the drawing in which like numerals are used to designate like parts in the several views throughout:

Figure 1 is a fragmentary perspective view of a molding strip positioned on a panel with an attaching clip according to the present invention associated therewith;

Fig. 2 is an enlarged perspective view of the clip shown in Fig. 1;

Fig. 3 is an elevational view of the clip shown in Fig. 2, taken in the direction of the arrow 3 of Fig. 2;

Fig. 4 is an end elevational view of the clip shown in Fig. 3, with the panel and molding shown in their assembled relation in broken line;

Fig. 5 is a side elevational view of the clip shown in Fig. 3; and,

Fig. 6 is a view similar to Fig. 5, showing the panel in broken lines and showing the resilient action of the panel attaching means as the clip is applied to the panel.

Referring to the drawing, a sheet metal panel is illustrated at 10, which may be a part of an automobile body, having a channel-shaped, metal molding strip 12 attached thereto. The molding 12 has inturned flanges 14 and 16, the outer surfaces of which are adapted to bear against the adjacent surface of panel 10. The panel 10 is provided with a plurality of generally rectangular apertures 18 therethrough at spaced intervals therealong, such apertures being formed along the line on which the molding 12 is to be fixed.

An embodiment of the clip attaching means, according to the present invention, is generally indicated at 20. Such clips are adapted to be positioned at spaced intervals along the length of the molding strip and panel, one of such clips being disposed within each of the apertures 18. The clips are provided with anchoring portions, which engage the molding and other anchoring portions which engage the panel for securing the molding strip to the panel. The clips are stamped out of resilient sheet metal material, which is hardened and tempered.

The clip 20 comprises a generally rectangular base portion 22, which is generally complementary in shape to the shape of aperture 18, and which is slightly longer than the length of the aperture. Leg members 24 are formed integral with the base 22 on opposite sides thereof and are substantially centrally disposed between the ends of the base 22. Such legs 24 terminate in outwardly diverging portions 26 and inwardly diverging portions 28 to form resilient anchoring means which engage the inturned edges 14 and 16 of the molding 12. The facing free edges of the legs 24 have removed portions 30, leaving projections 32 on the ends thereof, and such facing edges are normally spaced from each other. When the molding 12 is applied to the clip, such legs may be resiliently urged toward each other, so that the molding may be snapped thereover; and when the legs return to their normal position, the inturned edges 14 and 16 are engaged by the outwardly diverging portions 26, so that the molding 12 is pulled toward and held tightly against the panel 10.

The ends of the base 22 extend beyond the side edges of legs 24, as indicated by portions 34, which are resilient. Other resilient leg members 36 are formed integral with the ends 34 of the base 22 and extend away from the base in the same direction as legs 24. Such legs 36 terminate in outwardly disposed end flanges 38 and such end flanges are disposed a shorter distance from the base 22 than the length of legs 24.

The legs 24 and legs 36 extend from the base in a direction generally normal thereto and when positioned within the panel and molding, the legs 24 exert a resilient attaching force on the molding 12 in a direction substantially normal to the direction of the resilient attaching force of legs 36 on panel 10.

When the clips 20 are attached to the molding 10, the base 32 thereof is inserted through aperture 18, so that the legs 36 are resiliently urged toward each other, as illustrated in Fig. 6. When the clip 20 is completely positioned within the aperture 18, it will be seen that the legs 36 exert outwardly resilient forces against the end edges of such apertures with the flanges 38 lying substantially flush against the outer face of panel 10. It will also be observed that the width of legs 36 and flanges 38 is substantially the same width as the width of apertures 18, so that such flanges 38 may lie within the space between the facing edges of inturned flanges 14 and 16.

In positioning the clip for attaching the molding to the panel, the clip may first be applied to the apertures within the panel and the molding may thereafter be snapped over the attaching portions of legs 24; or, the clips may first be attached to the molding 12 and may thereafter be inserted in apertures 18 of the panel 10.

By the construction and arrangement of the clip of the present invention with respect to the panel 10 and with respect to the molding, it will be seen that the molding 12 is secured to the panel and that the clip will not turn with respect to the panel.

Formal changes may be made in the specific embodiment of the invention described without departing from the spirit and substance of the invention, the scope of which is commensurate with the appended claims.

What is claimed is:

1. An attaching clip formed of resilient metal material comprising an elongated base member, integral leg members on opposite sides of said base member, said leg members having end portions which diverge and then converge with respect to each other forming resilient anchoring means, and other integral leg members on opposite ends of said base member terminating in outwardly disposed end flanges forming resilient anchoring means, said end flanges being disposed in the same plane.

2. An attaching clip formed of resilient metal material comprising an elongated base member, integral leg members on opposite sides of said base member and extending in a direction substantially normal thereto, said leg members having end portions which diverge and then converge with respect to each other forming resilient anchoring means, and other integral leg members on opposite ends of said base member extending in the same direction as said first named leg members and terminating in outwardly disposed end flanges forming resilient anchoring means, said end flanges being disposed in the same plane.

3. An attaching clip formed of resilient metal material comprising an elongated base member, integral leg members on opposite sides of said base member and extending in a direction substantially normal thereto, said leg members having end portions which diverge and then converge with respect to each other forming resilient anchoring means, and other integral leg members on opposite ends of said base member and extending in the same direction as said first named leg members, said other integral leg members terminating in outwardly disposed end flanges, said end flanges being disposed from said base member a distance less than the length of said first named leg members.

4. An attaching clip formed of resilient metal material comprising a generally rectangular base member, integral leg members on opposite sides of said base member and disposed substantially centrally thereof, said leg members having end portions which diverge and then converge with respect to each other forming resilient anchoring means, and other integral leg members on opposite ends of said base member and extending in the same direction as said first named leg members, said other integral leg members terminating in outwardly disposed end flanges, thereby forming resilient anchoring means.

5. An attaching clip formed of resilient metal material comprising a generally rectangular elongated base member, integral leg members on opposite sides of said base member, said leg members having end portions which diverge and then converge with respect to each other forming resilient anchoring means, the opposite ends of said base member extending beyond the side edges of said leg members, and other integral leg members on the opposite ends of said base member and extending in the same direction as said first named leg members, said other leg members terminating in outwardly disposed end flanges, thereby forming resilient anchoring means.

6. In an assembly comprising a sheet metal panel, means forming an aperture in said panel and a molding strip having inturned flanges, a clip for securing said molding strip in fixed position to said panel, said clip comprising an elongated base member disposed through said aperture, integral leg members on opposite sides of said base member, said leg members having end portions which diverge and then converge with respect to each other forming resilient anchoring means which engage said inturned flanges, and other integral leg members on opposite ends of said base member extending in the same direction as said first named leg members and resiliently engaging the edges of said aperture, said other leg members terminating in outwardly disposed end flanges overlying the exterior face of said panel.

7. In an assembly comprising a sheet metal panel, means forming a generally rectangular aperture in said panel and a molding strip having inturned flanges, a clip for securing said molding strip in fixed position to said panel, said clip comprising a generally rectangular base member disposed through said aperture, integral leg members on opposite sides of said base member, said leg members having end portions which diverge and then converge with respect to each other forming resilient anchoring means which engage said inturned flanges, the opposite ends of said base member extending beyond the sides of said leg members, other integral leg members on the opposite ends of said base member extending in the same direction as said first named leg members, said other leg members resiliently engaging the opposite ends of said rectangular aperture, and said other leg members terminating in outwardly disposed end flanges overlying the exterior face of said panel.

ROBERT L. BROWN.